United States Patent
Tenghamn (10) Patent No.: US 9,459,363 B2
(45) Date of Patent: Oct. 4, 2016

(54) METHOD AND SYSTEM OF PERFORMING GEOPHYSICAL SURVEYS WITH AUTONOMOUS UNDERWATER VEHICLES

(71) Applicant: PGS Geophysical AS, Lysaker (NO)

(72) Inventor: Stig Rune Lennart Tenghamn, Katy, TX (US)

(73) Assignee: PGS Geophysical AS, Oslo (NO)

( * ) Notice: Subject to any disclaimer, the term of this patent is extended or adjusted under 35 U.S.C. 154(b) by 390 days.

(21) Appl. No.: 13/706,485

(22) Filed: Dec. 6, 2012

(65) Prior Publication Data

US 2014/0160885 A1 Jun. 12, 2014

(51) Int. Cl.
*G01V 1/38* (2006.01)
*G01H 9/00* (2006.01)
*G01V 1/20* (2006.01)

(52) U.S. Cl.
CPC ............ *G01V 1/3817* (2013.01); *G01H 9/004* (2013.01); *G01V 1/201* (2013.01); *G01V 1/3843* (2013.01); *G01V 1/3808* (2013.01)

(58) Field of Classification Search
CPC ..... G01V 1/38; G01V 1/3808; G01V 1/3843
USPC ...................................... 367/15–18
See application file for complete search history.

(56) References Cited

U.S. PATENT DOCUMENTS

| | | | |
|---|---|---|---|
| 3,440,992 A * | 4/1969 | Chance | 114/245 |
| 4,115,753 A | 9/1978 | Shajenko | |
| 5,345,522 A | 9/1994 | Vali et al. | |
| 5,367,376 A * | 11/1994 | Lagakos et al. | 356/477 |
| 5,825,489 A | 10/1998 | Lagakos et al. | |
| 5,872,876 A | 2/1999 | Kluth et al. | |
| 6,011,752 A * | 1/2000 | Ambs et al. | 367/17 |
| 6,267,070 B1 | 7/2001 | Russell et al. | |
| 6,278,823 B1 | 8/2001 | Goldner et al. | |
| 6,474,254 B1 * | 11/2002 | Ambs et al. | 114/312 |
| 6,515,939 B1 | 2/2003 | Green et al. | |
| 6,630,658 B1 | 10/2003 | Bohnert et al. | |
| 6,850,461 B2 | 2/2005 | Maas et al. | |
| 6,982,925 B2 | 1/2006 | Maas et al. | |
| 7,252,046 B1 | 8/2007 | Ead et al. | |
| 7,489,844 B2 * | 2/2009 | Shinoski | 385/113 |

(Continued)

FOREIGN PATENT DOCUMENTS

| | | |
|---|---|---|
| RU | 2424538 | 7/2011 |
| WO | 2010/136810 | 12/2010 |

OTHER PUBLICATIONS

Wadhams, et al., "A new view of the underside of Arctic sea ice," Geophys. Res_ Lett., 33, L04501, doi:10.102912005GL025131. (2006).*

(Continued)

*Primary Examiner* — Ian J Lobo (57) ABSTRACT

Performing a geophysical survey beneath a surface obstruction, or around a fixed object or formation. At least some of the example embodiments include: programming a towing pattern into an autonomous underwater vehicle; and towing a sensor streamer under the surface obstruction, or around the fixed object or formation by the autonomous underwater vehicle. In some of the embodiments, the sensor streamer comprises a distributed sensor in the form of an optical fiber. In some of the embodiments, the optical fiber is encapsulated in an outer covering of resilient material, the resilient material exposed to the water during the towing.

22 Claims, 6 Drawing Sheets

(56) References Cited

U.S. PATENT DOCUMENTS

| | | | |
|---|---|---|---|
| 7,793,606 B2* | 9/2010 | Olivier | G01V 1/3826 114/245 |
| 7,889,601 B2 | 2/2011 | Goodmote et al. | |
| 2006/0120675 A1 | 6/2006 | Goldner et al. | |
| 2008/0192570 A1* | 8/2008 | Lennart Tenghamn et al. | 367/17 |
| 2009/0074367 A1* | 3/2009 | Shinoski et al. | 385/113 |
| 2010/0185348 A1* | 7/2010 | Webb | 701/21 |
| 2010/0302900 A1* | 12/2010 | Tenghamn | 367/20 |
| 2010/0302901 A1* | 12/2010 | Welker et al. | 367/21 |
| 2011/0153219 A1 | 6/2011 | Fernihough | |
| 2012/0020185 A1* | 1/2012 | Welker et al. | 367/16 |
| 2012/0035854 A1* | 2/2012 | Kragh et al. | 702/17 |
| 2012/0069702 A1* | 3/2012 | Muyzert et al. | 367/15 |
| 2012/0227504 A1 | 9/2012 | Goldner et al. | |
| 2013/0083623 A1* | 4/2013 | Brizard et al. | 367/15 |

OTHER PUBLICATIONS

Capps, R.N. et al. Evaluation of Environmental Effects on Candidate Polymeric Materials for Underwater Optoacoustic Sensors. Ind. Eng. Chem. Prod. Res. Dev., 1982, 21 (4), pp. 540.

DuPont. Material Safety Data Sheet: Kevlar(R) Brand Engineered Elastomer. Version 2.1. Revised Aug. 20, 2008.

Lagakos, N. et al. Planar Flexible Fiber-Optic Acoustic Sensors. J. Lightwave Tech., Sep. 1990, vol. 8, No. 9, pp. 1298-1303.

Wikipedia.org. Distributed Acoustic Sensing. http://en.wikipedia.org/wiki/Distributed_acoustic_sensing. Mar. 5, 2012. Retrieved Aug. 20, 2012.

Maritime IT and Electronics, Issue 14, Mar./Apr. 2004, pp. 26-28.

Hill "The evolution and exploitation of the fibre-optic hydrophone", Proc of SPIE vol. 6619 661907-1 (2007), entire article.

Danish Patent and Trademark Office search report, application No. PA 2013 70738 mailed Mar. 12, 2015.

Danish Office Action, Application No. PA201370738, mailed Sep. 25, 2015.

* cited by examiner

METHOD AND SYSTEM OF PERFORMING GEOPHYSICAL SURVEYS WITH AUTONOMOUS UNDERWATER VEHICLES

BACKGROUND

Geophysical surveying, such as with seismic or electromagnetic sensing, are techniques where two- or three-dimensional "pictures" of the state of an underground formation are taken. Geophysical surveying takes place not only on land, but also in marine environments. Marine-based geophysical surveying faces significant challenges that are not faced by land-based surveying systems. For example, performing geophysical surveys under surface obstructions (e.g., sea ice) or around fixed objects or formations (e.g., rigs, derricks, coral, volcanoes), particularly where the obstruction completely covers the surface, is difficult.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Marine environment" shall mean an underwater location regardless of the salinity of the water. Thus, even an underwater location in a body of fresh water shall be considered a marine environment.

"Autonomous underwater vehicle" shall mean a vehicle submersible in water and comprising a propulsion system for use in water. The autonomous underwater vehicle is designed and constructed such that, during at least a portion of a submerged operation, the vehicle is not mechanically coupled to a surface vessel (e.g., is not coupled by a tether or umbilical) and is unmanned.

"Sea ice" shall mean ice structure(s) floating on water where the surface coverage of the ice structure(s) is at least ninety percent (90%). The term "sea ice" shall not speak to the salinity of the water on which the ice floats.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

Various example systems and methods are directed to towed geophysical surveying in difficult marine environments, such as under surface obstructions, or around fixed objects or formations. More particularly, various example systems and methods are directed to a sensor streamer towed by an autonomous underwater vehicle such that geophysical surveying may take place beneath surface obstructions, or around fixed objects or formations. In order to reduce towing force, and yet still provide near continuous coverage along the sensor streamer, the sensing element of the sensor streamer may be an optical fiber. The specification first turns to an example system.

Figure 1:
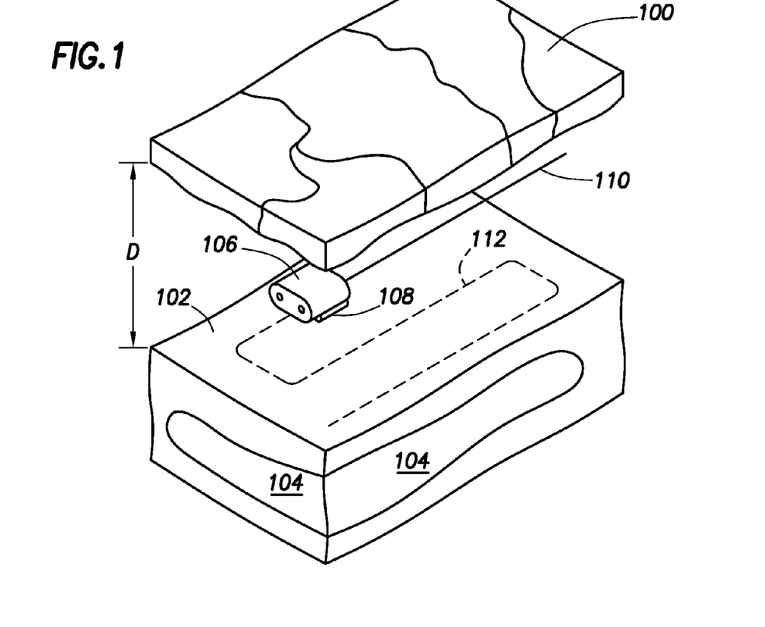
FIG. 1 shows a perspective cut-away view of a geophysical survey conducted in a marine environment under a surface obstruction in accordance with at least some embodiments.

FIG. 1 shows a perspective, partial cut-away view of a system to perform geophysical surveying in a marine environment beneath a surface obstruction. In particular, FIG. 1 shows a situation where the surface of the water is covered with sea ice 100. As shown, in some situations that sea ice 100 may fully cover the area over which a seismic survey is desired, making marine-based seismic surveys using sensor arrays towed by surface vessels impractical if not impossible. At a depth D beneath the sea ice 100 resides the sea floor 102, and below the sea floor 102 resides an example hydrocarbon bearing formation 104.

In order to perform the geophysical survey under surface obstructions, or around fixed objects or formations, an autonomous underwater vehicle (AUV) 106 towing a sensor streamer 110 is used. As the name implies, the autonomous underwater vehicle 106 is an unmanned submersible device that can be programmed in advance to perform certain operations, such as diving to a predetermined depth, traveling along a predetermined path or paths (e.g., path 112 shown in dashed lines), returning to a predetermined location, and surfacing. In many cases the autonomous underwater vehicle 106 is a battery operated device having one more forms of propulsion suitable for submerged operation, such as thrusters illustrated by thruster 108 in the view of the FIG. 1. Greater detail regarding operation of the autonomous underwater vehicle is provided below.

Sensor streamers towed by surface vessels in related-art systems are complex devices comprising an outer jacket defining an interior volume, and within the interior volume resides many devices, such as: communication cables; ropes or lines to carry the axial load; a plurality of individual sensing devices (e.g., hydrophones, geophones, accelerometers, electrodes, magnetometers) at spaced apart locations; as well as buoyancy fill material to help set the buoyancy. In many cases, sensor streamers towed by surface vessels may have outside diameters of 5 to 8 centimeters (cm) or more. Sensor streamers of such large outside diameter results in significant towing force for the tow vessel. While developing sustained towing force by surface vessels is not an issue, autonomous underwater vehicles may operate on battery power. Thus, while significant towing force can be developed by electric motors, the sustainability of significant towing force with power derived from batteries is limited.

Still referring to FIG. 1, in order to reduce the towing force associated with sensor streamers towed by autonomous underwater vehicles, in example systems the sensor streamer 110 is a distributed sensor comprising an optical fiber as the sensing element. A single mode optical fiber may have an outside diameter of 1 millimeter (mm) or less, and with various additional coverings and devices (discussed more below), the sensor streamer 110 may have an outside diameter of 10 mm or less, and in certain example systems the sensor streamer 110 may have an outside diameter of 5 mm or less. In some cases, the sensor streamer 110 may be on the order of 8000 meters in length to 12,000 meters in length, with the length dependent to some extent upon the depth of the target hydrocarbon reservoir 104 beneath the sea floor 102. The towing force used to tow a sensor streamer having an outside diameter of 10 mm or less is significantly less than the towing force used to tow a sensor streamer of 8 cm, and thus the total energy dissipation from batteries onboard the autonomous underwater vehicle 106 during towing may be sufficient to perform a geophysical survey and return to an area where retrieval of the autonomous underwater vehicle 106 is possible. The specification now turns to example operational considerations for use of an optical fiber as a distributed sensor.

Figure 2:
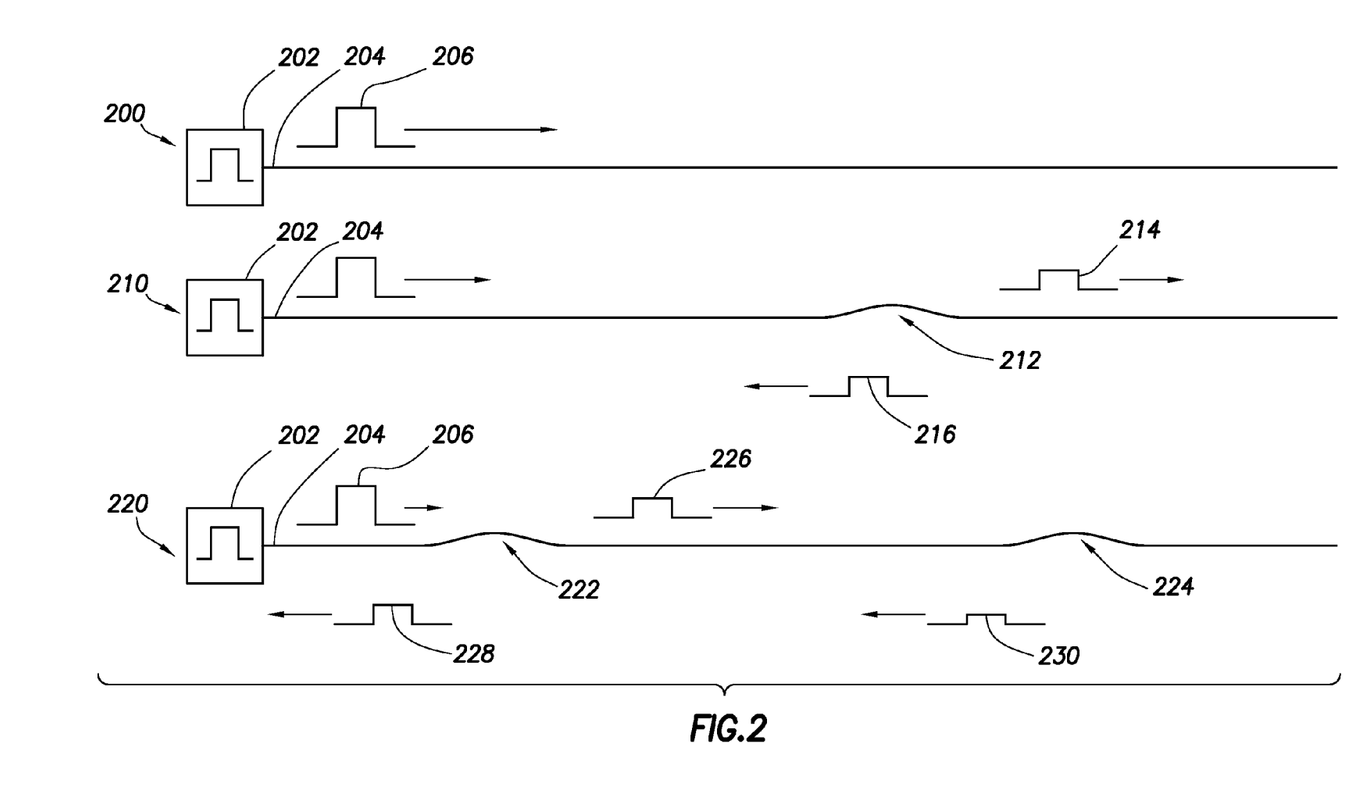
FIG. 2 shows a series of drawings to describe distributed seismic sensing using an optical fiber in accordance with at least some embodiments.

Optical fibers are efficient at transmitting light along and within the fiber; however, changes in various physical attributes of the fiber result in changes the refractive index of the optical fiber material, which changes the ability of the optical fiber to transmit light. FIG. 2 shows a plurality of optical fibers in various configurations to give a high level overview of operation of an optical fiber as a distributed seismic sensor. In particular, consider a first situation 200 comprising a source of coherent light 202 (e.g., laser, laser diode) optically coupled to a long straight optical fiber having uniform temperature and carrying uniform axial load. When a pulse of light is created by the source 202 and optically coupled to the optical fiber 204, the pulse of light propagates along the fiber 204 away from the source (the propagating light pulse illustrated as pulse 206). As the pulse 206 propagates along the optical fiber 204, some attenuation is present, but the attenuation is uniform per unit distance in the example situation of the uniform temperature and axial load.

Now consider second situation 210 where a portion of the optical fiber 204 experiences perturbation 212 at some distance from the source 202 which results in the optical fiber 204 stretching slightly (e.g., a slight length increase). The perturbation 212 results in localized changes in forces experienced by the optical fiber 204, which localized changes in forces also results in localized changes in the refractive index of the optical fiber. If we consider again a pulse 206 propagating along the fiber from left to right, when the pulse encounters the perturbation 212, the transition of the light from an area of a first refractive index to the changed refractive index at the perturbation 212 results in a reflection of a portion of the light. Thus, a portion of the light continues past the perturbation, shown by pulse portion 214, and a portion of the light reflects back toward the source 202, as shown by pulse portion 216. Eventually, the pulse portion 216 arrives back at the source 204 end of the optical fiber. The location of the perturbation along the optical fiber 204 may be determined based on the speed of light in the optical fiber and the return time of the pulse portion 216 relative to the launching of the pulse 206. Moreover, the magnitude of the perturbation may be determined based on characteristics of the pulse portion 216 as detected at the source-end of the optical fiber 204 (e.g., intensity of the light within the pulse portion 216). More technically stated, in accordance with example systems perturbations of the optical fiber result in at least Rayleigh scattering at the site of the perturbation. Different types of scattering phenomenon are possible, such as Brillouin scattering which results in Doppler shift of the reflected light.

Still referring to FIG. 2, and in particular third situation 220. In the example third situation 220 multiple portions of the optical fiber 204 experience perturbations, each perturbation at a different distance from the source 202, which results in the optical fiber 204 stretching slightly at each location (e.g., perturbations 222 and 224). The perturbations 222 and 224 each result in localized changes in force experienced by the optical fiber 204, which localized changes in forces also results in localized changes in the refractive indices the optical fiber. If we consider again a pulse 206 propagating along the fiber from left to right, when the pulse encounters the perturbation 222, a portion of the light continues past the perturbation 222, shown by pulse portion 226, and a portion of the light reflects back toward the source 202, as shown by pulse portion 228. Eventually, the pulse portion 228 arrives back at the source 204 end of the optical fiber. Pulse portion 226 continues propagating along the fiber, and when the pulse portion encounters the perturbation 224, a portion of the light continues past the perturbation 224 and a portion of the light reflects back toward the source 202, as shown by pulse portion 230. Eventually, the pulse portion 230 arrives back at the source 204 end of the optical fiber.

The location of each perturbation along the optical fiber 204 may be determined based on the speed of light in the optical fiber and the return time of the various pulse portions relative to the launching of the pulse 206. As before, the magnitude of the perturbation may be determined based on characteristics of the pulse portion as detected at the source-end of the optical fiber, possibly taking into account that returning pulses from a distant perturbation may encounter intervening perturbations. The specification now turns to a system-level operation of the distributed sensor.

Figure 3:
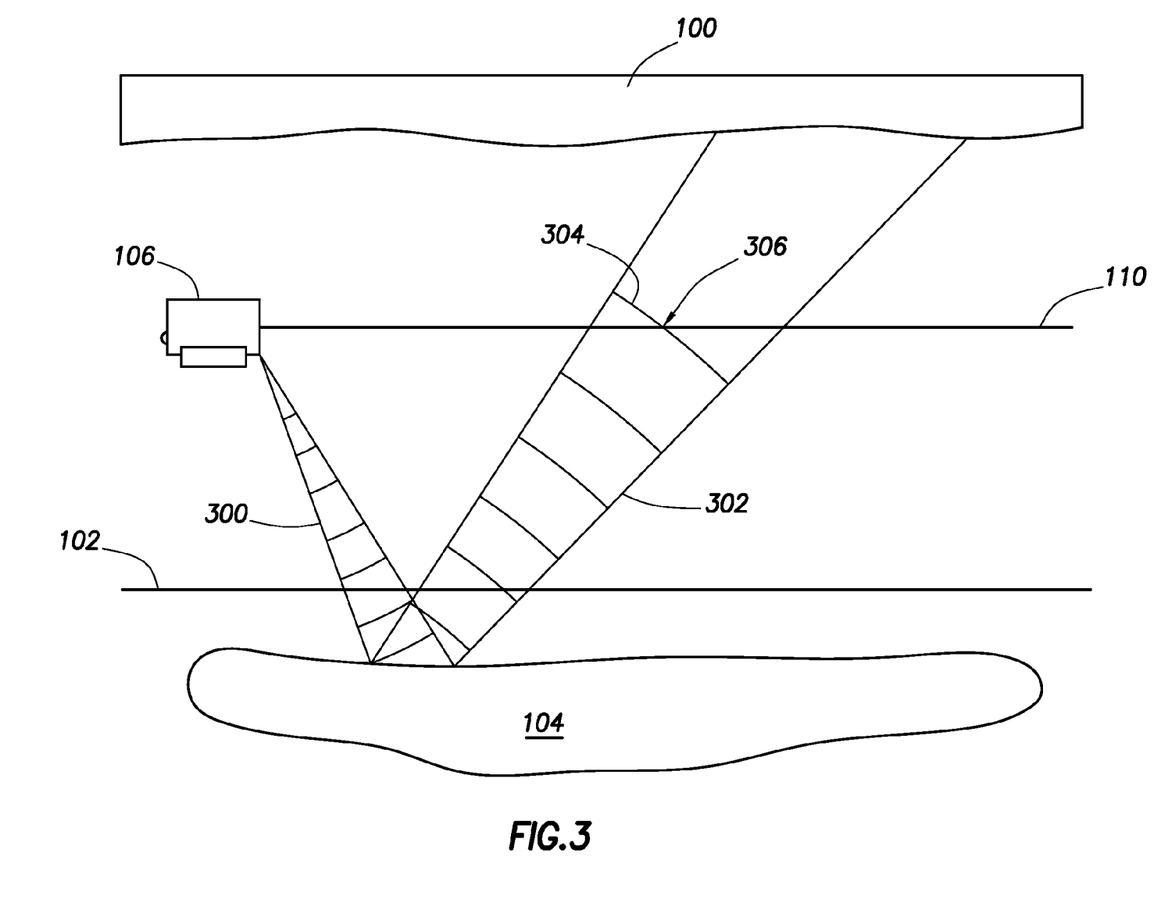
FIG. 3 shows side elevation, cut-away view of interrogating energy reflecting from a hydrocarbon bearing formation and being sensed by an optical fiber in accordance with at least some embodiments.

FIG. 3 shows a side elevation view a geophysical survey to tie together the perturbations discussed with reference to FIG. 2 and use of an optical fiber as distributed sensing element in seismic surveying. In particular, FIG. 2 shows the autonomous underwater vehicle 106 travelling beneath the sea ice 100 and towing the sensor streamer 110. In this example system, the autonomous underwater vehicle 106 releases interrogating acoustic energy 300, illustrated by expanding wave fronts 300. It is noted that the source of the interrogating energy may come from any suitable location, including not only the autonomous underwater vehicle 106, but also from: another autonomous underwater vehicle located nearby; a surface vessel; or a source positioned on and/or through the sea ice 100. Ignoring reflections from the sea floor 102, the interrogating energy 300 propagates to and encounters the hydrocarbon bearing formation 104, and a portion of the energy is reflected resulting in reflected acoustic energy 302, again illustrated as expanding wave fronts. The reflected acoustic energy 302 encounters the seismic sensor 110. Consider, as an example, the wave front 304 as the wave front passes the seismic sensor 110. As the wave front 304 passes the seismic sensor 110, the increased (or decreased) pressure causes a small perturbation in the seismic sensor 110. For example, in the situation depicted in FIG. 3, a small perturbation may be present at location 306. As the wave front continues, the location of perturbation changes to the right in this example. By pulsing the light source and measuring return optical signals (the pulsing at, for example, the Nyquist rate or above) a system may measure the location of the perturbations caused by interaction of acoustic energy with the seismic sensor 110.

The spatial resolution of a sensor streamer 110 may be controlled, in part, by the pulse time of the light source. For sensor streamers having lengths on the order to 10,000 meters, a light-pulse length of about 10 nano-seconds (ns) results in a spatial resolution of about 1 meter. That is, assuming sufficient amplitude of a light pulse, a 10 ns pulse may enable resolving the spatial location of a perturbation associated with passing acoustic energy to within 1 meter of the overall length. Example electrical and optical systems are discussed in greater detail below, after a discussion of the design and construction of an example sensor streamer 110.

Figure 4:
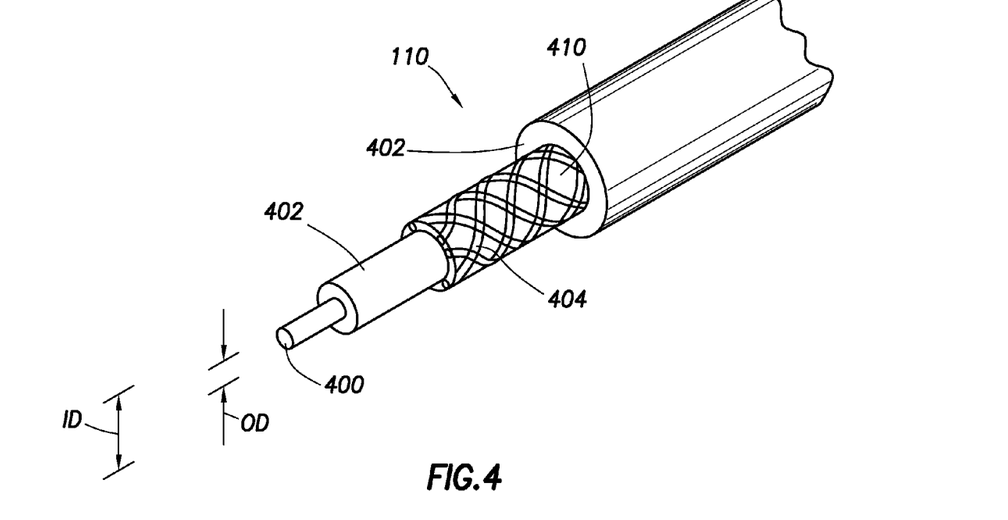
FIG. 4 shows a perspective partial cutaway view of sensor streamer in accordance with at least some embodiments.

FIG. 4 shows a perspective, partial cut-away view of a sensor streamer 110 in accordance with at least some example systems. In particular, FIG. 4 shows the example sensor streamer 100 comprises an optical fiber 400, which optical fiber 400 in example systems is a single mode optical fiber having an outside diameter (OD) of 1 mm or less. In the example sensor streamer 110, the optical fiber is embedded within a resilient material 402. In the view of FIG. 4, the resilient material is "stripped back" to show strength member 404 embedded within the resilient material 400. Resilient material 402 may take many suitable forms. In some example systems, the resilient material 402 may be a polymeric coating or covering (e.g., polyurethane, polyvinylidene fluoride), but any material resistant to sea water with low bulk modulus and/or high Young's modulus may be used.

The resilient material may serve several purposes, but not all purposes are necessarily present in every operational system. One potential purpose served by the resilient material 402 is to increase the physical size of the sensor streamer 110. That is, while theoretically possible to tow a single optical fiber as a sensor streamer, the dimension of a single mode optical fiber (e.g., 1 mm or less) is too small to be handled properly in most cases. Thus, in accordance with example systems the resilient material 402 may be used to increase the size of the sensor streamer 110 to enable more efficient handling. Another potential purpose of the resilient material is to protect the optical fiber 400 from damage caused by contact with handing equipment and/or contact with obstacles and/or debris within the marine environment. In other example systems, the resilient material 402 may add strength such that longer lengths of the sensor streamer may be towed than if the sensor streamer relied on the strength of the optical fiber alone.

Yet another purpose of the resilient material 402 may be to increase the acoustical coupling between the water and the optical fiber 400. That is, in some cases acoustic impedance of the water through which acoustic energy propagates is significantly different than the acoustic impedance of the optical fiber 400. In order to enable sufficient acoustic coupling, the resilient material may be selected to have an acoustic impedance between that of water and the optical fiber 400 such that more acoustic energy encounters (and propagates through) the optical fiber, and less energy is merely reflected at the sensor streamer. A related purpose may be to help control the buoyancy of the sensor streamer 110. That is, in many example systems the sensor streamer 110 is designed and constructed to be neutrally buoyant. However, water density changes with temperature and salinity, and so neutral buoyancy is a locally defined. For use in salt water the sensor streamer 110 is designed to have a density of about 1.03 grams per cm (g/cm), while for use in fresh water the sensor streamer may have a density of about 1.00 g/cm.

Still referring to FIG. 4, in some example systems, particularly systems in which the sensor streamer 110 is relatively short, the optical fiber 400 and resilient material 402 alone may provide sufficient strength for towing. However, in other systems where longer lengths of sensor streamer 110 are contemplated, the sensor streamer 110 may further comprise a strength member 404 embedded in the resilient material 402. In the example system of FIG. 4, the strength member 404 is shown to be a mesh that defines an internal diameter (ID), and the optical fiber 400 is disposed within the internal diameter of the mesh. In some cases, the strength material may be a rope or mesh comprising Kevlar® brand materials, but strength materials of other varieties may also be used. In yet still other cases, the strength material in the form of a rope and the optical fiber may reside side-by-side in the resilient material 402. Regardless of the location of the strength member 404 in relation to the optical fiber 400, in example systems the towing force is carried, at least in part, on the strength member 404.

The partial cut-away view of FIG. 4 implies two different resilient materials—one between the optical fiber 400 and the strength member 404, and a second outside the strength member 404. In some cases, construction of a sensor streamer having distinct layers of resilient material is possible. In other example systems, the resilient material 402 is continuous, and the strength material 404 is embedded therein during forming the resilient material around the optical fiber 400 (e.g., when the resilient material 402 is in a liquid phase). In yet still other example systems, the sensor streamer 110 may be initially assembly as separate inner- and outer-layers of resilient material, which may be then be fused (such as by heating), enabling the resilient material to flow through gaps 410 in the strength member 404 and fuse, forming an integrated structure. The specification now turns to depth control of the sensor streamer 110.

In some example operational scenarios, depth of the sensor streamer 110 is controlled exclusively by the autonomous underwater vehicle 106. That is, depth of the autonomous underwater vehicle 106 in combination with forward motion and substantially neutral buoyancy of the sensor streamer 110, may enable the autonomous underwater vehicle 106 to sufficiently control depth of the sensor streamer 110. In other example operational scenarios, such as operations in water with currents and/or sub-sea turbulence, the autonomous underwater vehicle 106 alone may not be able to sufficiently control depth of the sensor streamer 110. In such situations, the sensor streamer 110 may comprise a plurality of depth control devices, such as shown in FIG. 5.

Figure 5:
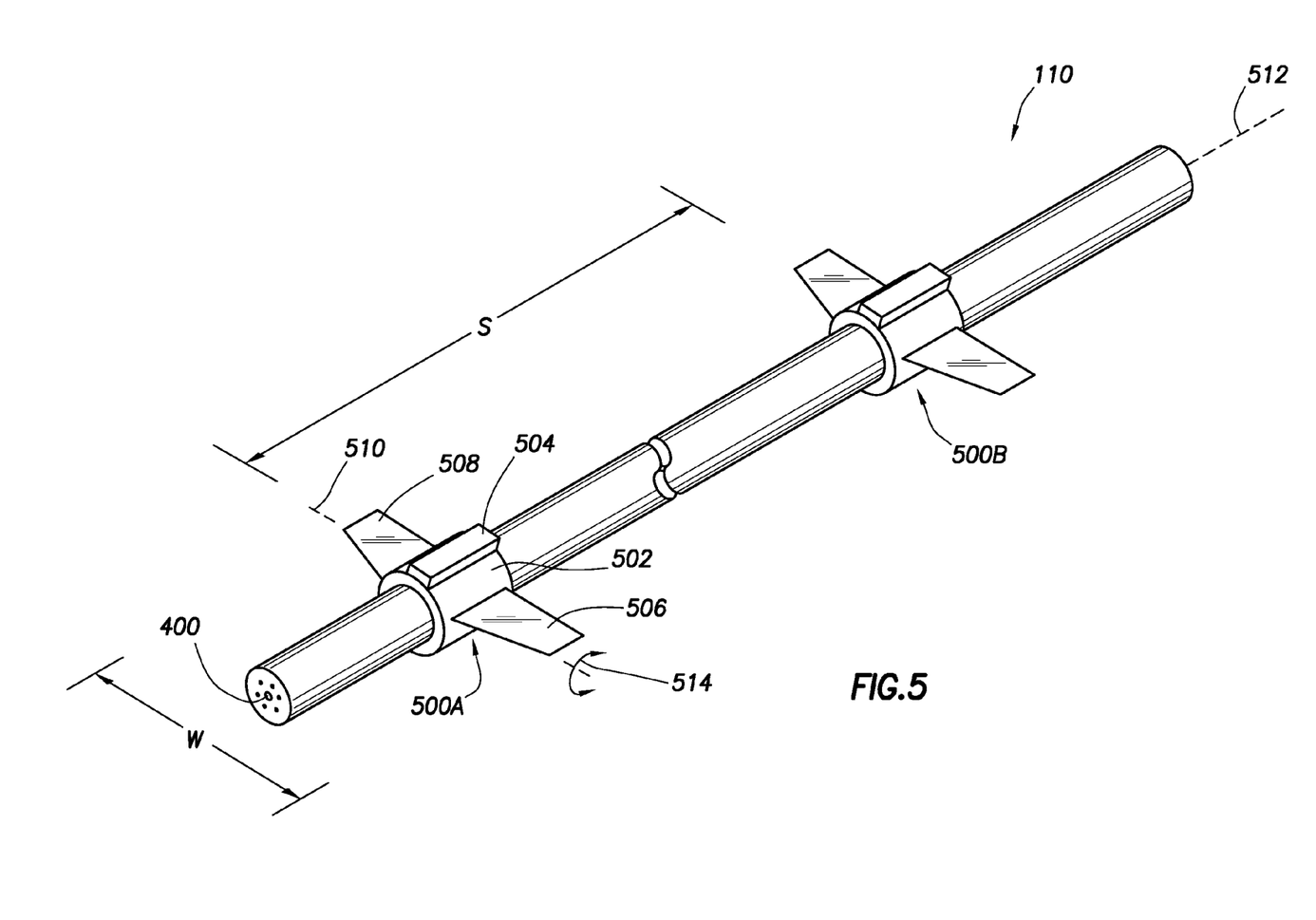
FIG. 5 shows a perspective view of a sensor streamer comprising depth control devices in accordance with at least some embodiments.

FIG. 5 shows a perspective view of a sensor streamer 110 comprising a plurality of depth control device 500. The depth control devices 500, if present, may be placed at spaced intervals along the sensor streamer 110. For example, in some cases the depth control devices 500 may be placed with a spacing S on the order of every 300 meters or so along the sensor streamer 110. Each depth control device may comprise a main body 502 coupled around (i.e., circumscribing) the outside diameter of the sensor cable 110. The main body 502 couples to the sensor cable 110 with sufficient force to prevent the depth control device from slipping axially along the sensor cable. The main body 502 may define a control logic section 504, within which various control and communication components may reside. For example, a control system (not specifically shown) may reside within the control section, and the control system may comprise a battery, a depth sensor, and a processor programmed to perform depth control.

In order to implement the depth control, the depth control devices 500 may further comprise "wings" or "planes" 506 and 508. In some cases, the planes 506 and 508 may be selectively adjustable during use, the adjustability about an axis 510 perpendicular to a long axis 512 of the sensor streamer 110. For example, if the portion of the sensor streamer 110 to which the depth control device 500A is below a predetermined depth, the planes 506 and 508 may be simultaneously rotated upward (rotation illustrated by arrow 514) such that an upward force is created. Likewise, if the portion of the sensor streamer 110 to which the depth control device 500A is above a predetermined depth, the planes 506 and 508 may be simultaneously rotated downward such that a downward force is created. In yet still other cases, the planes 506 and 508 may be individually controlled to implement steerage and/or to counteract twisting of the sensor cable 110 during use.

Inasmuch as the sensor cable 110 may have an outside diameter of 10 mm or less, the physical size of the depth control devices 500 may likewise be relatively small (in comparison, for example, to depth control devices designed for use with sensor cables having outside diameters of 3 cm or more). In one example system, the wing span W of a depth control device 500 may be on the order of 10 cm or less, with the wing span controlled in part by expected towing speed. In example systems, the depth control devices 500 are not communicatively coupled to the autonomous underwater vehicle 106 by way of the optical fiber 400. However, communication between the autonomous underwater vehicle 106 and the depth control devices 500 may be implemented using acoustic communication techniques through the surrounding water. For example, the autonomous underwater vehicle 106 may send, acoustically, commands for all the depth control devices 500 such as: to begin active depth control; to cease active depth control; or to set a new depth to which to control. The specification now turns to considerations regarding the autonomous underwater vehicle 106.

In some example systems, the autonomous underwater vehicle 106 and the sensor streamer 110 are coupled together at the surface (e.g., on a surface vessel), and then the autonomous underwater vehicle 160 with the sensor streamer 110 in tow travels along the predetermined path at the predetermined depth. However, in other example systems the autonomous underwater vehicle 106 and the sensor streamer 110 are an integrated unit, where the autonomous underwater vehicle 106 carries the sensor streamer 110 on-board, deploys the sensor streamer 110 at the appropriate time and/or location, and later retrieves the sensor streamer 110 to an on-board storage location.

Figure 6:
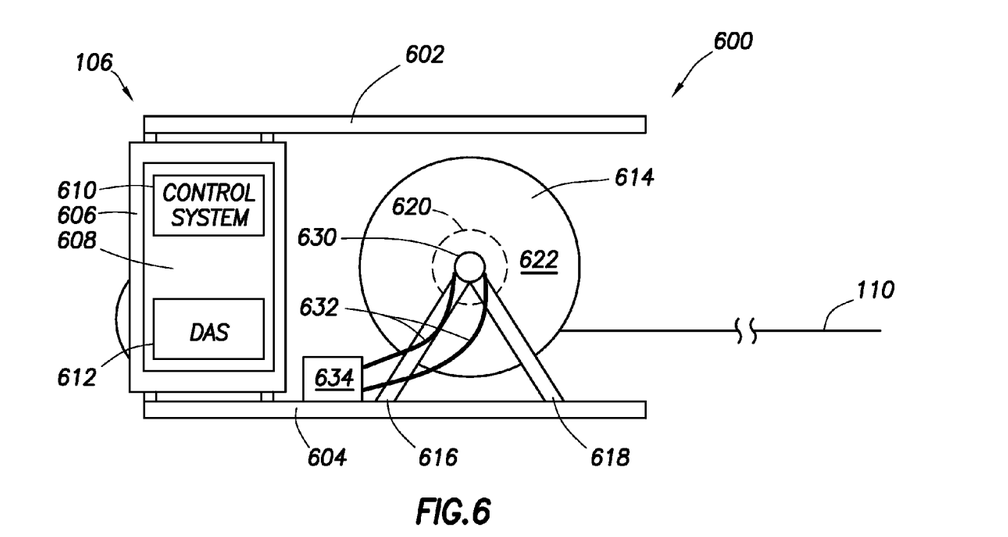
FIG. 6 shows a cut-away elevation view of an autonomous underwater vehicle including a spool in accordance with at least some embodiments.

FIG. 6 shows an elevation, partial cut-away view of an autonomous underwater vehicle 106 configured to carry the sensor streamer 110 as an on-board deployable device. In particular, FIG. 6 shows that the autonomous underwater vehicle 106 may comprise a rigid frame to which other components may be attached. The frame may be constructed of any suitable material, such as steel, stainless steel, aluminum, titanium, or combinations. In the view of FIG. 6, upper frame member 602 and lower frame member 604 are visible, but the frame 600 may comprise many members coupled together forming a rigid or semi-rigid structure. Moreover, though illustrated and described as "upper" and "lower" frame members, one of ordinary skill in the art with the benefit of this disclosure would recognize that frame 600 may be installed and/or operated in any orientation that permits deployment of sensor streamer 110.

An enclosure 606 may couple to the frame 600, where the enclosure defines a sealed volume 608. Within the sealed volume 608 of the enclosure may reside a variety of components, such as the control system 610 configured to autonomously control depth, speed, and directly of the autonomous underwater vehicle 106. Also within the sealed volume 608 may be a data acquisition system (DAS) 612 configured read and store data associated with the optical fiber in the sensor streamer.

In example systems where the sensor streamer 110 is carried onboard by the autonomous underwater vehicle 106, the system may comprise a spool 614 coupled to the frame 600 such that the sensor streamer 110 can be extended from the spool during use, and likewise retracted back onto the spool 614 after the geophysical survey is complete. In the example system of FIG. 6, the spool 614 couples to the frame 600 by way of frame member 616 and 618 such that the spool 614 can rotate about an axis (the axis of rotation of the spool 614 perpendicular to the plane of the page in FIG. 6). The relatively small size of the sensor streamer 110 enables the autonomous underwater vehicle 106 to carry the sensor streamer onboard, even when the sensor streamer 110 deployed length is 10,000 meters or more. Consider, as an example, a spool 614 where the innermost carrier portion 620 (shown in dashed lines) defines a cylinder with an outside diameter of 30 cm, and an axial length of 30 cm between larger diameter outer walls (only outer wall 622 visible in FIG. 6). A spool with the example dimensions can hold about 60 turns of a sensor streamer 110 having a 5 mm outer diameter at each "wrap level" on the spool. Thus, if the spool 614 is large enough to hold a mere 100 "wrap levels" (implying an overall outside diameter of the spool of about 1.3 meters), the spool 614 may hold about 14,000 meters of sensor streamer 110. In some example systems using depth control devices, the depth control devices themselves may be carried on the spool 614, and as such the length of the sensor streamer 110 that may be carried on the spool may decrease.

In the example system of FIG. 6, a hydraulic system may be used to rotate the spool 614 to extend and retract the sensor streamer 110, as illustrated by hydraulic motor 630 and hydraulic hoses 632 coupled to the hydraulic system 634. However, any suitable system may be used to rotate the spool 614, such as dedicated alternating current (AC) or directed current (DC) electrical motors, and stepper motors. In the case of extending or deploying the sensor streamer 110, the spool 614 may be placed in a "free wheeling" mode, where the force exerted on the sensor streamer 110 as the autonomous underwater vehicle 106 moves through the water may pull the sensor streamer 110 off the spool 110.

Figure 7:
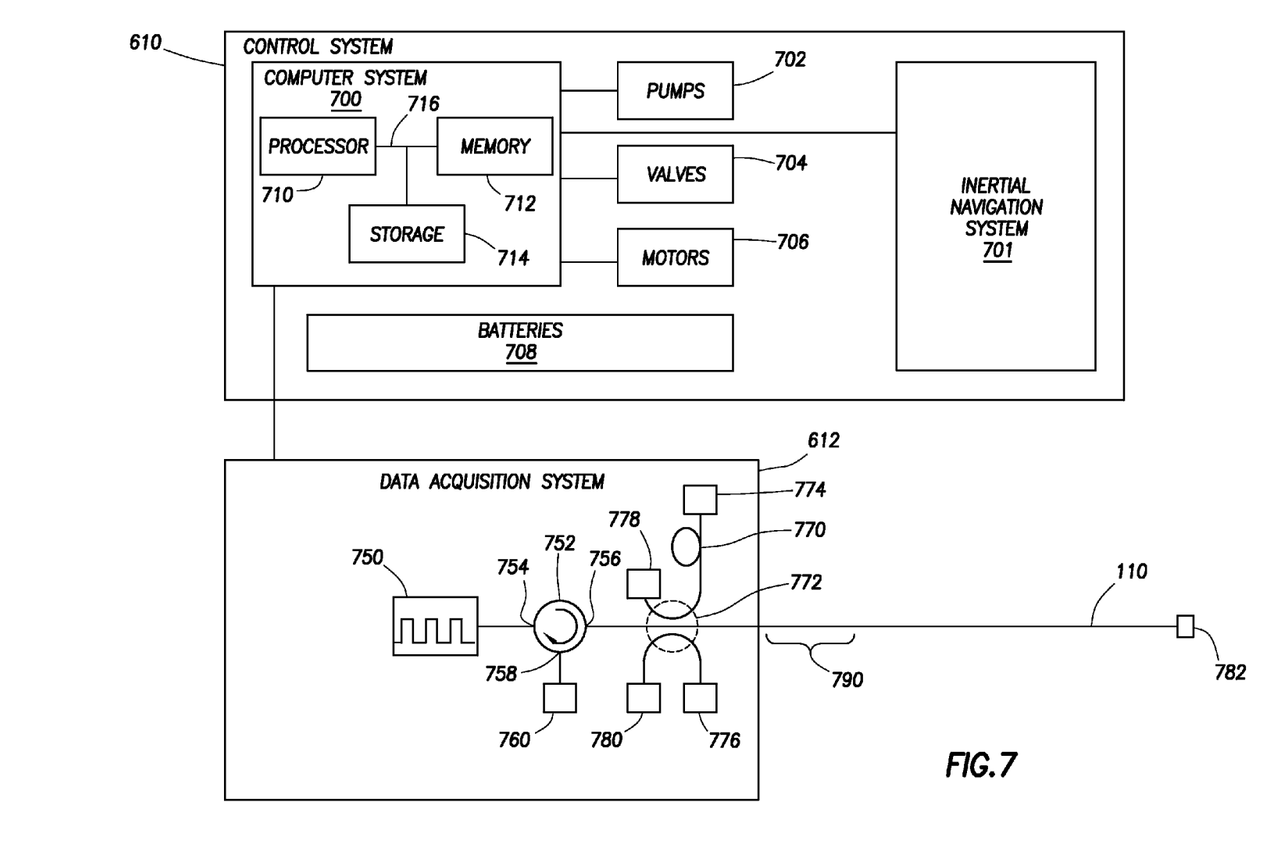
FIG. 7 shows a block diagram of a control system and data acquisition module of an autonomous underwater vehicle in accordance with at least some embodiments.

The specification now turns to example electrical and optical systems. FIG. 7 shows, in block diagram form, an example electrical and optical system that may be implemented within the autonomous underwater vehicle 106. In particular, FIG. 7 shows the control system 610 coupled to the data acquisition system 612, which in turn is coupled to the sensor streamer 110. The control system 610 may comprise a computer system 700 operatively coupled to various pumps 702, valves 704, and motors 706 that control the various functions of the autonomous underwater vehicle 106. The computer system 700 may also couple to an inertial navigation system 701, from which various direction and velocity information may be derived. Moreover, the control system 610 comprises batteries 708, which provide operational power to all the systems of the autonomous underwater vehicle 106 during autonomous operation. The electrical coupling of the batteries 708 to the various other systems is not shown so as not to unduly complicate the figure.

The computer system 700 may comprise any suitable processor-based system that can be programmed to control the depth, speed, and direction of the autonomous underwater vehicle 106 during operation. In the example system of the FIG. 7, the computer system comprises a processor 710 coupled a main memory 712, as well as a long term, non-volatile storage device 714 (hereafter just "storage device 714"). The processor 710 may be any currently available or after-developed processor configured to executed programs. The main memory 712 may the working memory from which the processor 710 executes instructions, and the main memory 712 may be any of the various types of random access memory (RAM). In some example systems, the processor 710 and main memory 712 may be individual components operatively coupled together; however, in other systems the processor 710 and memory 712 may be an integrated unit, such as any currently available or after-developed microcontroller. The storage device 714 may be a long term storage device where instructions and data are held. In some cases, the storage device 714 may be spinning disk hard drive or optical drive, and in other cases the storage device 714 may be solid state storage (e.g., an array of flash memory devices). In one example systems, the data obtained from the data acquisition system 612 is stored on the storage device 714 for retrieval once the autonomous underwater vehicle 106 has returned to the surface.

The data acquisition system 612 couples to the control system 610, and likewise operatively couples to the optical fiber of the sensor streamer 110. The precise nature of the various parts and components contained within the data acquisition system 612 are dependent upon the type of detection system used to detect and/or analyze returning optical signals along the sensor streamer 110. In some cases, the reflected optical signals may be detected in an absolute level sense. For example, a light source 750 may create a series of light pulses that are applied to the sensor streamer 110 by way of an optical circulator 752. That is, light applied to the port 754 of the optical circulator 752 exits port 756, but not port 758; however, reflected light traveling along the sensor streamer 110 enters the circulator 752 through port 756 and exits port 758, but not port 754. Thus, by detecting the level or intensity of reflected light by an optical detector 760, the arrival and timing of the reflected light signals may be determined.

However, other example systems may use an interferometer as a detection mechanism. Still referring to the data acquisition system 612, detection based on interferometry may involve splitting the light energy of each pulse such that a portion of the light travels along a path 770 of know length. The splitting of the light may be by way of an optical coupler 772. In the example system of FIG. 7, a light pulse entering the optical coupler 772 from the left is split into three portions: one portion traveling along the sensor streamer 110; one portion entering the optical path 770; and a final portion entering optical detector 776. The portion entering the optical detector 776 may be used as an indication of signal strength of the initial light pulse. The portion of the light traveling along path 770 is reflected at the distal end of the path, such as by an optical reflector 774. Likewise, light traveling along the sensor streamer 110 may be reflected at various perturbations (not specifically shown in FIG. 7).

Light reflected at the optical reflector 774 propagates to the optical coupler 772. Likewise, light reflected at the perturbations propagates to the optical coupler 772. The reflected light interferes at and/or within the optical coupler 772 to create an interference signal. The interference signal is split into three portions: a portion entering the optical detector 778; a portion entering the optical detector 780; and a portion which enters the circulator 752 and is applied to the optical detector 760. From the various portions of the interference signal, parameters regarding the perturbations may be determined, such as the reflected intensity, changes in polarization, and changes in frequency.

In some cases, an optical reflector 782 may be installed on the distal end of the sensor streamer 110 such that the data acquisition system 612 can collect data regarding light that has traveled over the entire path length. In some example systems, the data acquisition system 612 analyzes the interference signals to determine the parameters regarding perturbations of the optical fiber of the sensor streamer 110. In other cases, the data acquisition system 612 provides all the data to the control system 610 for storage, and thus later analysis (e.g., after the autonomous underwater vehicle 106 has returned to the surface).

A few additional notes regarding the data acquisition system. The example interferometer shown in FIG. 7 may be "tuned" for detection along a particular length of the sensor streamer 110, though not necessarily the complete length. For example, depending on the time length of each pulse and the physical length of the path 770, the interferometer may be tuned to detect reflections occurring in a portion of the length (e.g., portion 790) of the sensor streamer 110. Thus, the overall optical detection system within the data acquisition system 612 may comprise a plurality of interferometer circuits similar to FIG. 7, with each interferometer circuit tuned to a particular section of the overall length of the sensor streamer (e.g., tuned by length of the path 770).

Figure 8:
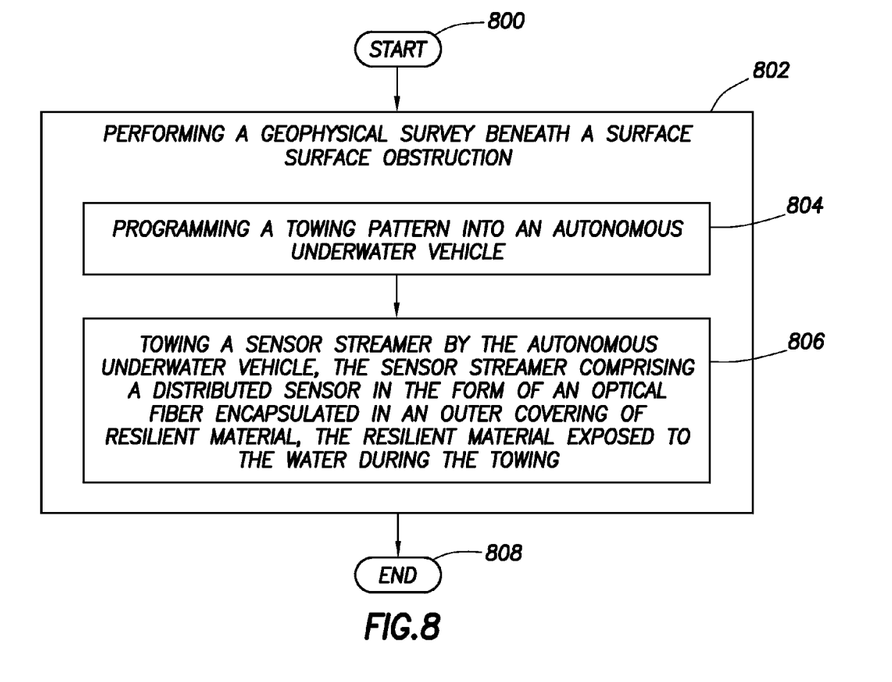
FIG. 8 shows a method in accordance with at least some embodiments.

FIG. 8 shows a method in accordance with at least some embodiments. In particular, the method starts (block 800) and comprises performing a geophysical survey beneath a surface obstruction, or around a fixed object or formation (block 802). Performing the geophysical survey beneath a surface obstruction, or around a fixed object or formation may be by: programming a towing pattern into an autonomous underwater vehicle (block 804); and towing a sensor streamer under the surface obstruction, or around the fixed object or formation by the autonomous underwater vehicle. In some embodiments, the sensor streamer may comprise a distributed sensor in the form of an optical fiber. In some embodiments, the optical fiber may be encapsulated in an outer covering of resilient material, the resilient material exposed to the water during the towing (block 806). Thereafter, the method may end (block 808), in some cases to be restarted at the same or a different survey location and/or with other similarly configured autonomous underwater vehicles.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
performing a geophysical survey by
programming a towing pattern into an autonomous underwater vehicle;
towing a sensor streamer by the autonomous underwater vehicle, the sensor streamer comprising:
a distributed sensor in the form of an optical fiber encapsulated in an outer covering of resilient material, the resilient material exposed to the water during the towing, wherein the outer covering has an acoustic impedance between the acoustic impedance of water and the acoustic impedance of the optical fiber; and
a plurality of depth control devices at spaced intervals along the senor streamer, wherein the depth control devices each include a main body and a plane and are each configured to adjust a depth of the sensor streamer;
retracting the sensor streamer onto a spool carried by the autonomous underwater vehicle; and
carrying the main body and the plane of each of the depth control devices on the spool.

2. The method of claim 1 further comprising deploying the sensor streamer from the spool after the autonomous underwater vehicle is beneath a surface obstruction.

3. The method of claim 1 wherein towing further comprises towing the sensor streamer having a length of 8000 meters or greater.

4. The method of claim 1 wherein towing further comprises towing the sensor streamer comprising a single optical fiber encapsulated in the outer covering.

5. The method of claim 1 wherein towing further comprises towing the sensor streamer comprising a strength member embedded in the resilient material.

6. The method of claim 1 wherein towing further comprises towing the sensor streamer where the sensor streamer has an outside diameter of 10 millimeters or less.

7. The method of claim 1 wherein towing further comprises towing the sensor streamer where the sensor streamer has an outside diameter of 5 millimeters or less.

8. The method of claim 1 wherein towing further comprises towing beneath a surface obstruction.

9. The method of claim 1 wherein towing further comprises towing beneath sea ice.

10. The method of claim 1, wherein towing the sensor streamer comprises towing the plurality of depth control devices at spaced intervals along the sensor streamer, wherein each depth control device includes a wing span of 10 cm or less.

11. A system comprising:
a sensor streamer comprising
a distributed sensor comprising an optical fiber;
an impedance matching material, where the optical fiber is embedded in the impedance matching material and wherein the impedance matching material has an acoustic impedance between the acoustic impedance of water and the acoustic impedance of the optical fiber; and
a plurality of depth control devices at spaced intervals along the senor streamer, wherein the depth control devices each include a main body and a plane and are each configured to adjust a depth of the sensor streamer; and
an autonomous underwater vehicle comprising
a data acquisition system operatively coupled to the optical fiber of the sensor streamer;
a control system configured to autonomously control depth, speed, and direction of the autonomous underwater vehicle;
a frame; and
a spool operationally coupled to the frame;
wherein the sensor streamer is mechanically coupled to the spool; and
wherein the main body and the plane of each of the depth control devices are configured to be carried on the spool.

12. The system of claim 11 wherein the sensor streamer further comprises a strength member embedded in the impedance matching material.

13. The system of claim 11 wherein the sensor streamer further comprises a strength member, and wherein the optical fiber resides within an internal diameter of the strength member.

14. The system of claim 11 wherein the sensor streamer further comprises a single optical fiber embedded in the impedance matching material.

15. The system of claim 11 further comprising the sensor streamer having a length of 8000 meters or greater.

16. The system of claim 11
wherein the control system is configured to extend the sensor streamer from the spool during autonomous operation.

17. The system of claim 11
wherein the control system is configured to retract the sensor streamer onto the spool during autonomous operation.

18. The system of claim 11 wherein the sensor streamer has an outside diameter of 10 millimeters or less.

19. The system of claim 11 wherein the sensor streamer has an outside diameter of 5 millimeters or less.

20. The system of claim 11 wherein the data acquisition system further comprises:
a light source, the light source configured to provide pulses of light; and
a detector system, the detector system configured to determine a location along the optical fiber an acoustic wave interacting with the optical fiber.

21. The system of claim 20 wherein the detector system is configured to determine the location based on Rayleigh scattering of light at the location.

22. The system of claim 11, wherein each depth control device includes a wing span of 10 cm or less.

* * * * *